United States Patent [19]
Redetzky

[11] 4,256,134
[45] Mar. 17, 1981

[54] REGULATING VALVE FOR DIVIDING A FLOW INTO A PLURALITY OF INDIVIDUAL FLOWS

[75] Inventor: Manfred Redetzky, Hamburg, Fed. Rep. of Germany

[73] Assignee: Klöckner Stahltechnik GmbH, Hamburg, Fed. Rep. of Germany

[21] Appl. No.: 24,979

[22] Filed: Mar. 29, 1979

[30] Foreign Application Priority Data

Mar. 31, 1978 [DE] Fed. Rep. of Germany ....... 2813851

[51] Int. Cl.³ .............................................. G05D 7/01
[52] U.S. Cl. .................................. 137/118; 137/494; 137/625.46
[58] Field of Search ............... 137/118, 119, 494, 506, 137/625.46

[56] References Cited

U.S. PATENT DOCUMENTS

| 37,786 | 2/1863 | Guernsey | 137/625.46 |
|---|---|---|---|
| 1,622,448 | 3/1927 | Kalkbrenner | 137/494 X |
| 2,664,910 | 1/1954 | Boyd | 137/118 |
| 2,701,609 | 2/1955 | Thorpe | 137/118 X |
| 3,431,933 | 3/1969 | Tidd | 137/119 |
| 3,931,803 | 1/1976 | Chattopadhayay | 137/625.46 X |
| 4,077,424 | 3/1978 | Ehret | 137/119 |

*Primary Examiner*—Robert G. Wilson
*Attorney, Agent, or Firm*—Otto John Munz

[57] ABSTRACT

A regulating valve for dividing a flow of fluid into a plurality of equal flows, wherein a pressure responsive member is positioned in a casing in communication with inlet pressure fluid, and a movable valve member with a plurality of equal size openings therethrough is connected with the pressure responsive member for movement therewith and is positioned in operative association with a plurality of outlet openings in the casing, whereby when the pressure responsive member is moved by inlet pressure fluid, the valve member is moved accordingly to open or close the outlet openings and thus obtain a plurality of equal, regulated flows through the plurality of outlets.

3 Claims, 4 Drawing Figures

REGULATING VALVE FOR DIVIDING A FLOW INTO A PLURALITY OF INDIVIDUAL FLOWS

BACKGROUND OF THE INVENTION

The invention relates to a regulating valve for fluids, such as liquids and gases, wherein the fluids are regulated and divided into a plurality of individual flows of equal parts.

A device is known for uniformly distributing an arriving gas or liquid flow into several outgoing pipelines, which device consists of a cylindrical container having a plurality of branch pipes attached to the periphery thereof. A reciprocable piston is exposed to the pressure medium entering the container, and corresponding to the piston position, effects a smaller or larger diameter of the outlet apertures to the branch pipe-lines. The device presents the disadvantage that leakage losses must be expected when the fitting is not sufficiently precise. Known regulating valves must be driven and adjusted by a motor, in which case the motor rotation must be adjusted to the liquid quantity to be regulated at each instance.

SUMMARY OF THE INVENTION

The purpose of the invention consists in the disclosure of a regulating valve for dividing fluids, especially liquids, but also gases, into a plurality of equal individual flows by means of which an arriving liquid or gas flow which may be variable in its quantity and viscosity is automatically divided at equal parts into several individual flows.

This task is accomplished according to the invention by a valve which consists of a stationary base provided with a multiplicity of bores of the same diameter, and a superposed rotatable perforated disk, in which structure the bores of the valve base and perforated disk coincide with each other in a fully opened state. The adjustment of the rotatable perforated disk takes place automatically as a function of the supplied media flow by way of a pressure responsive member such as a piston or diaphragm drive acted upon by the media flow, and may include an additional lever or linkage for transmission of movement from the pressure responsive member to the disk.

In the regulating valve of the invention, the distribution adjustment takes place automatically upon an increase of the liquid flow arriving at the valve, wherein the supply pressure increases automatically, and the pressure increase is utilized to actuate the rotatable perforated disk of the valve.

When the pressure drops due to a decrease of the liquid flow, for example, the valve closes automatically by spring force to the required control value. In this structure, the size of the spring is such that a minimum pressure difference between the entry side of the regulating valve and the exit side thereof is assured.

By the fact that a pressure difference is always maintained, a very substantial equipartition of the arriving main flow to the branche pipe-lines is assured.

The occurrence of any viscosity differences are automatically compensated with the regulating valve of the invention since only the total quantity of supply needs to be controlled.

OBJECTS OF THE INVENTION

An object of the invention is to provide a regulating valve of simple structure for dividing an inlet flow into a plurality of equal outlet flows.

Another object is to provide a regulating valve which is automatically adjusted as a function of the arriving liquid or gas flow, and no control connection, no adjustment indication and no adjustment drive are necessary.

A further object of the invention is to provide a regulating valve in which a separately arranged adjustment is eliminated, and the valve may be provided with water cooling, insofar as in the environment of the regulating valve increased temperature prevails.

Yet another object of the invention is to provide a regulating valve which can, with respect to its assembly, be treated like a pipe-line mounting and can thus be mounted in a preferred case of application directly on the base of a converter to which oil is to be supplied in a multiplicity of equal quantity flows.

DETAILED DESCRIPTION OF THE PREFERRED EMBODIMENT

Figure 1:
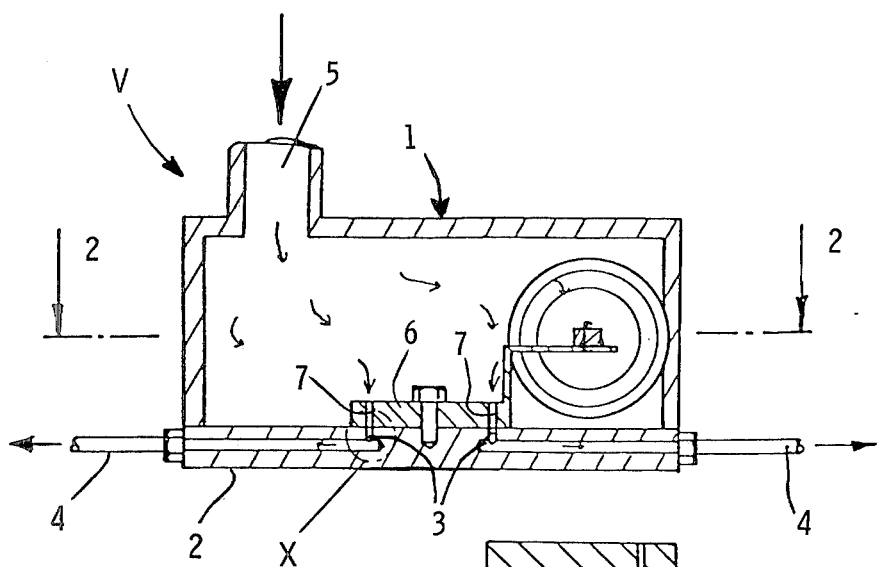
FIG. 1 is a longitudinal section through a regulating valve according to the invention.
Figure 2:
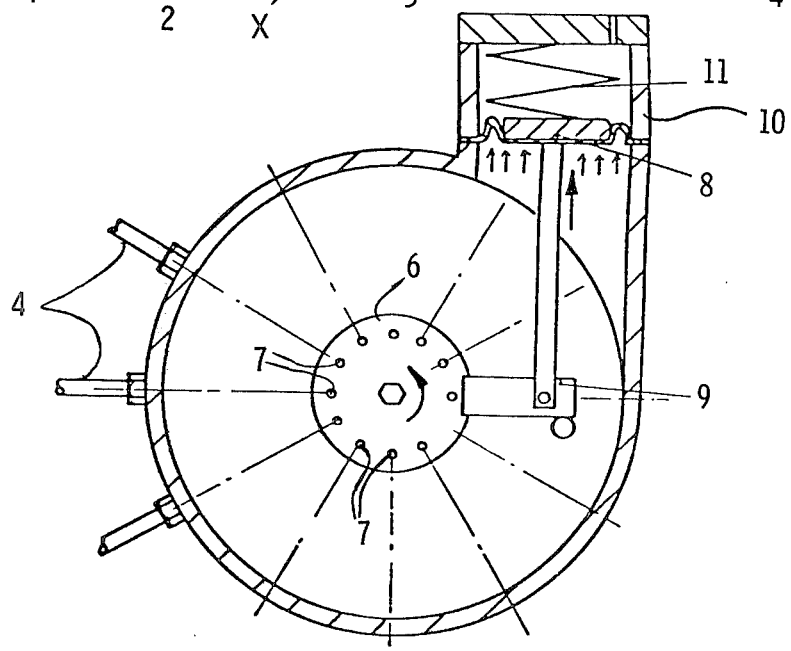
FIG. 2 is a horizontal section along line 2—2 in FIG. 1.

In the drawings, wherein like reference numerals indicate like parts throughout the several views, the regulating valve V is enveloped by a cylindrical casing 1. In the middle of the base 2 of the casing, a plurality of exit bores 3 of the same diameter for the liquid to be regulated are provided. A plurality of pipe lines 4 laterally branch off from the casing for the partial flows of the liquid. The entry aperture 5 for the liquid is provided at the top of the casing of the valve.

Above bores 3, which are circularly arranged at the base of the valve casing, a perforated disk 6 is rotatably mounted and is provided with bores 7 coinciding with bores 3 in the casing.

By means of a diaphragm drive 8 and a lever 9, perforated disk 6 can be oscillated or rotated back and forth. The diaphragm is positioned within a lateral valve casing chamber 10. Between diaphragm and chamber wall a spring 11 is provided.

The arriving quantity-controlled liquid flow enters the valve casing at 5, fills it and presses against diaphragm 8 positioned in the lateral valve casing chamber 10, which diaphragm in turn presses against spring 11. With the pressure increase diaphragm 8 moves perforated disk 6 via lever 9. By the rotation of the perforated disk, the aperture diameter of bores 3 and 7 is enlarged more or less depending on the pressure force.

Figure 3:
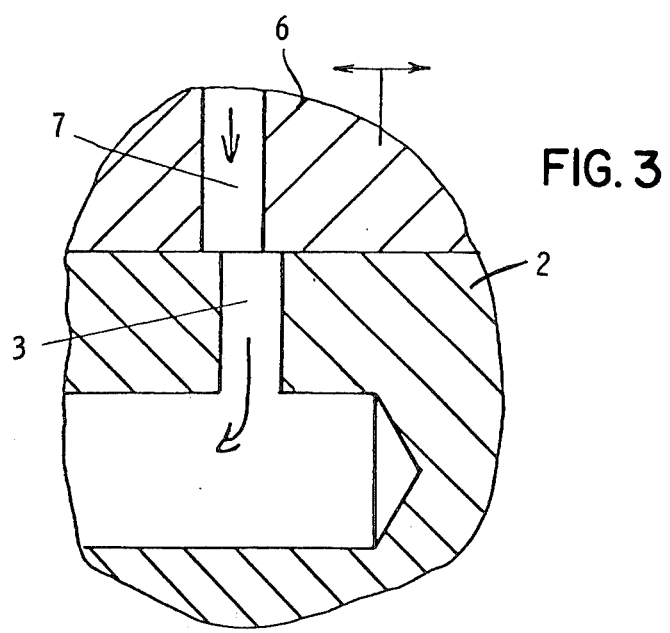
FIG. 3 is agreatly enlarged detail of FIG. 1 in longitudinal section.
Figure 4:
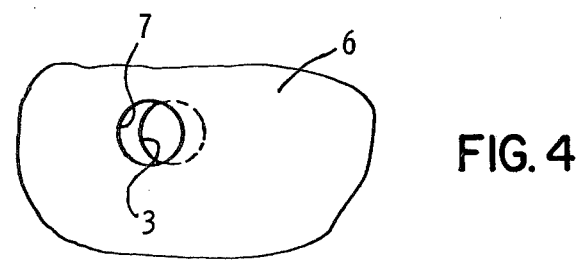
FIG. 4 is a greatly enlarged horizontal cutout of FIG. 3.

In FIGS. 3 and 4, an individual bore 3 in the valve base, and a bore 7 in the perforated disk, are shown in partially opened state.

Since all bores 3 and 7 are of the same diameter, the result is assured that the same liquid quantities pass through the perspective bores. In the fully opened state, bores 3 and 7 coincide.

When the pressure drops, due to the decrease of the liquid flow, for example, below a required minimum quantity, spring 11 presses the diaphragm in the opposite direction, and via lever 9 perforated disk 6 is turned to such a position that bores 7 of the perforated disk are positioned beside bores 3 in the valve base, e.g. such that the flow passage is completely blocked off.

Instead of the diaphragm drive shown in the embodiment, a piston drive or bellows or other pressure responsive means can of course be employed.

The regulating valve can, if necessary be provided as a whole with an external water cooling.

What is claimed is:

1. A regulating valve for dividing supplied liquid and gaseous media into a plurality of equal individual flows, characterized in that the valve comprises a stationary base provided with a multiplicity of bores of the same diameter, and a superposed rotatable perforated disk having a plurality of bores adapted to be placed in registry with the bores of the base, in which the bores of the valve base and the perforated disk coincide in a fully opened state, and a pressure responsive member acted upon by the supplied media and connected to drive the perforated disk such that flow through all of the bores is equally adjusted, whereby adjustment of the rotatable perforated disk takes place automatically in dependency of the supplied media flow to obtain simultaneous equal flow through the bores.

2. A regulating valve as claimed in claim 1, wherein linkage means is connected between the pressure responsive member and the perforated disk.

3. A regulating valve as claimed in claim 1, wherein the valve comprises a valve casing having an inlet opening and having a base with a plurality of circularly arranged outlet apertures therein, the rotatable perforated disk being mounted on the base contiguous with the apertures therethrough, and having a corresponding plurality of circularly arranged apertures adapted to coincide with the apertures in the base, the apertures being moved out of registry upon decrease of inlet flow pressure below a predetermined minimum.

* * * * *